Patented June 16, 1936

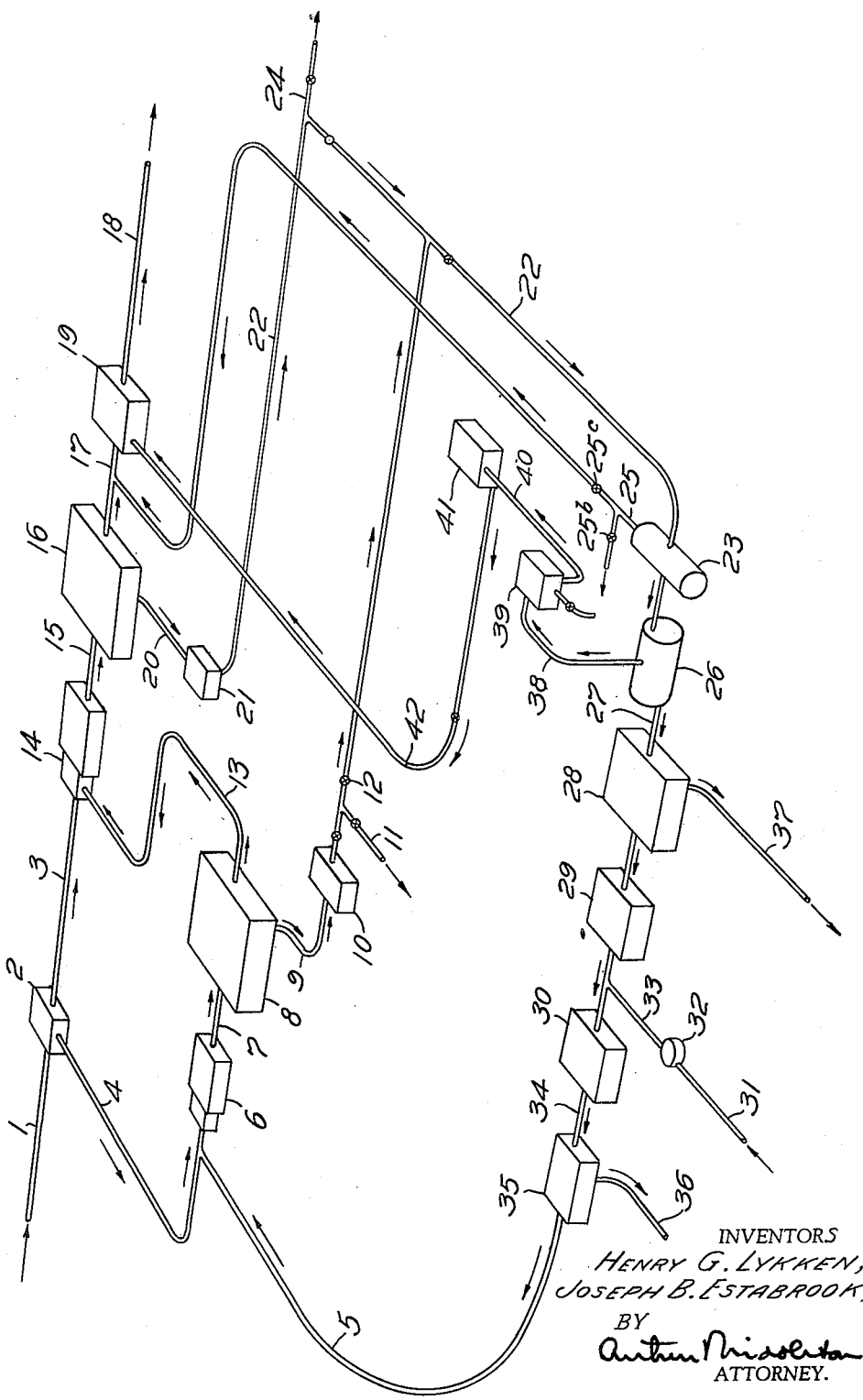

2,044,582

UNITED STATES PATENT OFFICE 2,044,582

WATER SOFTENING

Henry G. Lykken and Joseph B. Estabrook, Minneapolis, Minn.

Application March 27, 1934, Serial No. 717,567

11 Claims. (Cl. 210—16)

The invention relates to the treatment of water particularly to remove, overcome or decrease certain hardness characteristics thereof. In the performing of the invention there will also be realized a substantial elimination of any turbidity existing because of suspended solids therein.

It is well known that the hardness characteristics of certain water is due to the presence therein of calcium or more particularly certain compounds thereof, typified for example by calcium in the form of calcium bicarbonate—$Ca(HCO_3)_2$—and magnesium or more particularly certain compounds thereof typified for example by magnesium in the form of magnesium bicarbonate—$Mg(HCO_3)_2$.

The present invention particularly relates to a method and/or system for the treating of water having substantial calcium and magnesium hardness characteristics.

One object of the invention is to provide a lime (viz. calcium oxide—CaO) water softening treatment or process of such a character and to utilize it in such a manner that after the water softening treatment has once been started a supply of lime can be derived therefrom sufficient to at least provide a substantial portion of the lime required for the ultimate carrying out of the water treatment process, preferably sufficient to provide all the lime required for the process, and in certain instances sufficient not only to provide the lime required for the water treatment process but also an excess quantity available for other use or commercial distribution.

The water treatment according to one aspect thereof contemplates the diverting of a fraction or stream of the water to be treated—generally only a smaller fraction of the water, for example 12% to 25% of the water to be treated—and the preliminary subjecting of the diverted fraction with a relatively large quantity of lime as by dosing the diverted fraction with hydrated lime—to wit with calcium oxide—CaO—which has been hydrated or "slaked"—sufficient in quantity for satisfying all of the lime requirements in respect to the water to be treated namely, not only the 12% to 25% of diverted water but also the remaining 88% to 75% of water not thus diverted. In carrying out this preliminary or primary treating or dosing it is to be noted that the lime is in excess of the requirements for the diverted portion into which it is first introduced. Therefore under these conditions substantially all of the magnesium bicarbonate—$Mg(HCO_3)_2$—can be thrown down or precipitated in the diverted stream as magnesium hydroxide—$Mg(OH)_2$—, possibly some as magnesium oxide—MgO. This throwing down of the magnesium as a hydrate will also be accompanied with the conversion of the calcium bicarbonate—$Ca(HCO_3)_2$—into calcium carbonate—$CaCO_3$—and this as a solid suspended in the liquid in the diverted stream. In other words by said "liming" or dosing of the diverted flow or stream the soluble calcium and magnesium compounds or components in the diverted stream are converted into compounds less soluble in water, to wit, into compounds that are more or less readily precipitable out of the liquid or as otherwise expressed into a form or forms whereby they can settle as sludge in the bottom of the liquid.

The present invention contemplates the subjecting of the thus dosed diverted flow to a preliminary or primary settling tank or sedimentation chamber whereby from the diverted steam there can be removed in the form of sludge in or during the early stages of the treatment process—a certain percentage of the magnesium constituents of the water and thus avoid a certain portion of the magnesium constituents as a detrimental factor in the later stages of the process. By this preliminary sedimentation there is also removed in and as part of the sludge a substantial portion of the calcium carbonate—$CaCO_3$. However the removal of the calcium carbonate—$CaCO_3$—at this stage of the process is a less important or relatively unimportant factor in respect to the entire process, because as previously indicated a main feature of the process resides in the removal or elimination at or during an early stage thereof of an appreciable percentage of the magnesium constituents of the water.

The effluent from the primary sedimentation noted contains in solution the chemically unused lime available for the later requirements for the rest of the water treatment and according to the process this effluent is passed to and intimately mixed with the remaining undivided section or main flow of water to be treated whereby the main flow thus becomes dosed with the available lime in the primary effluent and the lime thus supplied is employed as for the converting of some of the calcium compounds such as calcium bicarbonate — $Ca(HCO_3)_2$ — into calcium carbonate—$CaCO_3$—and the magnesium compounds such as magnesium bicarbonate—$Mg(HCO_3)_2$—so that some become magnesium hydroxide—$Mg(OH)_2$—, some magnesium oxide—MgO—and some magnesium carbonate—$MgCO_3$—while some of the calcium compounds and magnesium compounds may remain as bicarbonates. The reaction between the lime—CaO—and the magnesium bicarbonate—Mg(HCO₃)₂—also results in the formation of calcium carbonate—CaCO₃.

The mixing of the effluent of the diverted flow and of the undiverted portion of the main flow is accompanied by an operation which furthers flocculation and also to a certain extent the intimate mixing. The particular intimate mixing operation under consideration may be referred to as the main mixing operation since it involves the mixing with the main flow, for the purpose of dosing the latter, the effluent of the preliminary or primary settling and which effluent as previously indicated carries the lime available and requisite for the continuation of the process.

This main mixing operation is followed by sedimentation which is carried out in a main settling tank or secondary sedimentation chamber as it is sometimes referred to. The solids of the sludge from this main sedimentation are ultimately subjected to calcination or roasting for the purpose of providing the lime employed in the process while the effluent from the main sedimentation is subjected to carbonation prior to sand filtering and prior to the ultimate use of the treated water.

It will also be noted that the roasted or calcined lime produced by the process as above outlined will or may have entrained grit or unburned material and one object of the invention involves treatment to remove grit and other unburned foreign matter prior to the introduction of the newly produced lime into the water to be treated.

In the carrying out of the process the calcined lime is preferably slaked as by the use of water or steam and is introduced as a calcium hydrate (containing magnesium compounds entrained therewith) into the diverted or lesser fraction of the water to be treated.

One aspect of the present invention revolves about the treating of lime hydrate to remove therefrom the grit and unburned matter and this is preferably accomplished by subjecting the lime hydrate to the action of a classifier, to wit, a classifier of the Dorr type, by which the grit and unburned material passes along one path as to waste and the lime hydrate passes along another path whereby it is mixed with the diverted flow for the purpose of supplying chemical dosing material requisite for the process.

Other objects, aspects and features of the invention will become apparent from that which follows particularly when considered in conjunction with the accompanying drawing constituting a part of the specification and in which drawing the sole figure thereof diagrammatically illustrates a system and apparatus within and according to which the invention may be realized.

Reference will now be made to the drawing in detail.

It has heretofore been pointed out that the present invention is directed to the treating of water having a calcium hardness characteristic because of a calcium component thereof provided for example by calcium bicarbonate—Ca(HCO₃)₂—and magnesium hardness characteristic because of a magnesium component thereof provided for example by magnesium bicarbonate—Mg(HCO₃)₂. Water having this dual hardness characteristic is supplied as along the path 1 and is passed to a dividing box or dividing weir mechanism 2 so that one or a main undiverted portion thereof passes along a main flow path 3 and so that another or diverted portion thereof—generally the lesser portion thereof—passes along the path 4 sometimes herein referred to as the diverted flow path. Lime used in the water treating system or process is supplied preferably in the form of hydrate along the path 5 and it is introduced into the diverted flow and intimately mixed therewith in and by means of a mixer or mixing device 6 which may be referred to as preliminary or primary mixing means. From the mixer 6 the limed or "dosed" diverted flow passes along the path 7 into a preliminary or primary settling tank or sedimentation chamber 8 wherein a preliminary quiescent settling or sedimentation operation is carried out. The lime which is intimately mixed with the diverted flow is sufficient in quantity for all the requirements of the process and is considerably in excess of the amount requisite for the diverted flow into which it is introduced.

As the lime is considerably in excess of the amount requisite, when considering only the diverted flow, it insures and effects a precipitation in the settling tank 8 of the magnesium content of the diverted flow mostly in the form of magnesium hydroxide—Mg(OH)₂—(some however may be in the form of magnesium oxide—MgO). The lime in this diverted flow also effects certain or some reactions with the calcium bicarbonate—Ca(HCO₃)₂—as well as with the magnesium bicarbonate — Mg(HCO₃)₂—whereby a certain amount of calcium precipitates in the form of calcium carbonate—CaCO₃—with the result that the sludge which settles in the settling tank 8 comprises as the main solid constituents thereof magnesium hydroxide—Mg(OH)₂—and calcium carbonate—CaCO₃. According to the present process all or generally a substantial part of the sludge from the settling tank 8 is removed from the process along the path 9 by means of the pump 10 and is immediately disposed of as along the valve controlled path 11, thereby avoiding any further objectionable effects from the magnesium thus withdrawn and eliminated. The withdrawing and disposing of the sludge at this point results in a disposal of some of the calcium compounds which might otherwise be available as a source of lime after the process is carried out. However if desired in order to preserve some of the calcium content thereof, some of this sludge can be passed along the valve controlled path 12 and for later reintroduction into the system as will hereinafter more fully appear.

The effluent from this preliminary sedimentation passes from the tank 8 along the path 13 into a main or secondary mixing means 14 which is also preferably constructed so as to further flocculation and thereby aid subsequent settling or sedimentation. The effluent that passes along the path 13 contains sufficient lime requisite for the completion of the process and may be referred to as providing the lime for effecting the liming or dosing of the main flow. From the main mixing and flocculating means 14 the dosed main flow passes along the path 15 to and into a main or secondary settling tank or sedimentation chamber 16 wherein the sedimentation operation which is carried out is of a character to effect a substantial separation of the resulting solids as sludge from the liquid content which leaves the sedimentation chamber 16 as a relatively clear effluent. The effluent from the chamber 16 passes along the path 17 and 18 as to a sand filter or other treatment and ultimately to water distributing pipes. On its way along the path 17 and 18 it is subjected to carbonation as in a carbonation apparatus designated as 19. The carbonation at this point is to convert remaining solid calcium and magnesium content respectively into the liquid or soluble form of calcium bicarbonate—Ca(HCO₃)₂—and magnesium bicarbonate—Mg(HCO₃)₂—, whereby objectionable settling out as solids of the remaining calcium and magnesium content is avoided.

The settled sludge obtained in the main settling tank 16 is passed therefrom through the pipe 20 and is pumped through the medium of the pump 21 along the path 22 as to the vacuum filter provided at 23. The pipe or path 22 is provided with a valve or valves for controlling the flow to the vacuum filter. This pipe 22 may be also provided with the valve controlled branch 24 by which, if desired, some of the sludge pumped by means of the pump 21 can be passed to waste. It will be noted that the valve controlled pipe 12 may be connected into the pipe 22 whereby, if desired, some sludge from the preliminary sedimentation can be passed by the pump 10 to and into the vacuum filter 23, the latter of which is provided for eliminating some of the liquid content of the sludge passed to the filter and is herein broadly referred to as a dewatering means, apparatus or device.

The filtrate from this filter can be passed as along the path 25 and the valve controlled branch 25c back into the system whereby it can be ultimately subjected to carbonation preparatory to delivery to the sand filter or it can be passed to waste through the valve controlled branch 25b. The solid portion or cake derived as the result of the filtering operation is passed into the kiln 26 whereby it is calcined or roasted, thus producing lime o. calcium oxide—CaO. This lime will also have entrained therein in effect as an impurity a certain amount of magnesium oxide—MgO— and possible to an extent other impurities or impurity as grit. The calcined product namely "quicklime" passes from the kiln along the path 27 to the lime storage 28 from which by means of the lime feeder 29 the requisite amount of lime is passed to a slaker 30 and to which slaker 30 water for slaking is supplied as through the pipe 31, meter 32 and pipe 33 in the proper amount for effecting or producing within the slaker 30 the desired slaked lime product. The slaked product or lime hydrate passes from 30 along the path 34 to a classifier 35, for example a classifier of the Dorr type, which functions to remove grit and unburned material all of which is disposed of as a reject along the path 36. From the classifier the lime hydrate, thus freed of grit, passes along the path 5 where it is mixed, preferably relatively intimately mixed, with the diverted flow in the mixing device 6 previously referred to.

Any excess of lime resulting from or produced by the process can be passed from the storage as along the path 37.

The offgoing gas resulting from the fuel combustion required for the calcining or roasting operation that is carried out in the kiln 26 contains carbon dioxide and is passed from the kiln in such a manner that at least some of the gas passes along path 38 into a scrubber 39 by which certain of the fine solids entrained in the gas are eliminated from the gas. Therefrom the cleaned or scrubbed gas is passed along the path 40 to a compressor 41 by which the gas is pumped along the valve controlled path 42 to the carbonation apparatus 19 whereby the carbonic gas can effect a carbonation of the treated water prior to its passing to the sand filters or in other words prior to passing into the distributing pipes.

From what has preceded it will be manifest the operation of the system is as follows.

The water to be treated flows inwardly along the path 1, and is divided at 2 into a main flow and a diverted flow. The diverted flow is limed or dosed—with lime hydrate obtained from lime derived from the process—and is thereafter subjected to primary or preliminary sedimentation by which the resulting sludge that contains magnesium can be readily eliminated or removed from the process. The effluent from the preliminary sedimentation contains sufficient lime to dose the main flow and is mixed with the main flow under conditions to further a main settling or secondary sedimentation operation that is thereafter carried out. The effluent from the main settling is available for use preferably after carbonation and preferably after having passed through a sand filter.

The sludge from the main settling which is a lime and magnesium sludge is passed to a vacuum filter for the purpose of removing a certain amount of water therefrom preparatory to calcining in a kiln wherein there is produced the lime which is later slaked to provide the lime hydrate used in the process. It will also be noted that according to the process described there is employed a classifier for effecting a classifying or cleaning of the lime hydrate to eliminate grit therefrom prior to introducing the lime hydrate into the system or effecting the desired softening or treating of the water.

As has been previously pointed out an important aspect of the present invention revolves about the lime treating of a portion of the water and an early elimination of the magnesium content from the thus treated diverted portion.

Another aspect of the invention also revolves about the employment of the classifier to remove grit or the like from hydrated lime immediately passing the hydrated lime into the water to be treated.

The invention hereof is applicable to the treatment of sewage and extends to and into that field.

From what has preceded it will be manifest that the invention hereof is applicable to the treatment of that which may be referred to broadly as impure water. The invention according to one specific aspect thereof relates to the treating of certain waters to eliminate or lessen certain impurities that impart hardness characteristics to the water, or, as more definitely expressed, to eliminate a quantity of magnesium content or a quantity of calcium content, or both, thus accomplishing what is technically known as a water softening process.

According to another specific aspect thereof the invention relates to the treatment of sewage in a manner employing a lime dosing of the sewage. By the steps outlined there is realized a substantial precipitation of organic solids in suspension and under conditions such that permit a passage of relatively clarified effluent along one path, and an elimination of the precipitated solids along another path, and from which by proper treatment lime is obtained or recovered and re-used in the process.

The invention according to the broadest aspects thereof applies to any and all forms of impure water which will respond to the treatment herein outlined. Therefore, according to the broadest aspects, the invention relates not merely to a water softening process or to a sewage treatment process but to the treatment of impure water generally, and as illustrative and not as limiting of the waters to which the invention is applicable, there is here mentioned that class of water having hardness characteristics incident to a magnesium or calcium content, and waters having solids, either organic or inorganic, and either dissolved or in suspension therein, thus including not only that which is known as hard water or that which is known as sewage, but also any other form of industrial or trade wastes of which water constitutes a major portion thereof.

What is claimed is:

1. In combination in a system wherein water is treated by lime, a supply for water to be treated, a preliminary mixing means, a main mixing means, a dividing box having one portion in communication with the preliminary mixing means and another portion in communication with the main mixing means, by which dividing box the water supply is divided into a diverted flow leading to the preliminary mixing means and a main flow leading to the main mixing means, a lime supply means by which hydrated lime is introduced into the diverted flow and is mixed with the latter in and by said preliminary mixing means, thereby dosing the diverted flow, a preliminary settling means that receives the dosed flow from the preliminary mixing means, means for conducting effluent from the preliminary settler to the main flow so that said effluent serves to dose the main flow when mixed with the latter in and by said main mixing means, means for withdrawing settled sludge from the preliminary settling means and for passing at least some of said sludge from the water treating system, a main settling means, means whereby the dosed main flow passes from the main mixing means to the main settling means, carbonation means, means for conducting effluent from the main settling means to the carbonation means, means by which the effluent after carbonation is passed from said carbonation means, a vacuum filter, a calcining kiln, a lime storage, a lime slaker, means by which settled sludge is passed from the main settling apparatus to said vacuum filter and whereby solids of said sludge are passed from the filter to said kiln, means whereby the calcined lime product is passed to said lime storage, means by which lime is passed from said storage to said slaker, and finally as hydrated lime into and through said lime supply means for the dosing of the diverted flow.

2. In a system as defined in and by the claim last preceding a classifier into and through which the slaked lime is passed prior to introduction into the preliminary mixing means and by which classifier foreign material as grit is removed from the hydrated lime.

3. A system wherein water having impurities therein is treated, said system comprising in combination means through which water to be treated is supplied, a preliminary mixing means, a main mixing means, a dividing box by which water supplied thereto by said supply means is divided into a diverted flow leading to the preliminary mixing means and a main flow leading to the main mixing means, a lime supply means by which lime is introduced into the diverted flow and thus mixed with the latter in and by said preliminary mixing means and thereby dosing the diverted flow, a preliminary settling means arranged to receive the thus dosed flow, means for conducting effluent from the preliminary settling means to the main flow so that said effluent serves to dose the main flow when mixed with the latter in and by said main mixer, means for withdrawing settled sludge from the preliminary settling means and from the system, a main settling means arranged to receive the thus dosed main flow, means for conducting effluent from the main settling means, means for withdrawing sludge from said main settling means, dewatering apparatus for eliminating certain of the water content of the sludge withdrawn from the main settling means, a calcining means, a lime receiving means, means by which settled sludge withdrawn from the main settling means is passed to said dewatering apparatus, means by which partially dewatered sludge is passed from said dewatering apparatus to and into said calcining means, means for passing the calcined product from said calcining means to and into said lime receiving means, and means by which lime requisite for the process is passed from said lime receiving means and ultimately to said diverted flow for dosing the latter.

4. In a system as defined in and by the claim last preceding a classifier into and through which the lime after having been hydrated is passed and by which classifier grit is eliminated prior to the lime hydrate being used for dosing the diverted supply.

5. A system for treating water having calcium and magnesium hardness characteristic and according to which system there is in combination and in operative arrangement means for mixing lime with the water, a settling means wherein the limed water is subjected to sedimentation, from which settling means the effluent passes along one path, and the settled sludge along another path, means for calcining sludge to convert the calcium content thereof into quicklime, a lime slaker for hydrating the quicklime thus produced and a classifier between said mixing means and said slaker, through which classifier the slaked lime passes for the removing of foreign matter as grit prior to the dosing of the water to be treated.

6. A system for treating water according to which there is means for feeding lime to and for mixing it with the water to be treated, in which there is a settling apparatus wherein the treated water is subjected to sedimentation, in which effluent passes from the settling apparatus along one path, in which settled sludge passes from the settling apparatus along another path, in which there is means whereby certain constituents of at least some of said sludge is calcined and thereby converted into lime, in which there is a lime slaker for hydrating lime, in which there is means for dosing water to be treated with the said hydrated lime, and in which there is provided a classifier between said mixing means and said slaker, through which classifier the slaked lime must pass and by which classifier certain foreign matter as grit is eleminated from the hydrated lime.

7. The treatment of water by the method which comprises dividing the water to be treated into a main flow and a diverted flow, supplying lime requisite for the water treating process by mixing the requisite quantity of hydrate of lime with the diverted flow, thereafter subjecting the thus treated, diverted flow to initial sedimentation to settle out suspended solids as magnesium hydroxide and calcium carbonates whereby there is an early elimination of a quantity of the magnesium content from the thus created diverted portion, passing the effluent from said sedimentation to the main flow and mixing the two flows, thereafter subjecting the thus mixed flows to a second sedimentation, passing the effluent from the second sedimentation along one path to ultimate use, passing settled sludge from the second sedimentation along another path whereat there is carried out an operation for eliminating from the sludge a substantial part of the water component thereof, calcining said dewatered sludge and thereby producing quicklime from the calcium component of the sludge, hydrating lime thus produced and employing said hydrated lime as the hydrate of lime that is mixed with a diverted flow for supplying the lime requisite for the process.

8. The treatment of water as defined in and by the claim last preceding and according to which there is a subjecting of the hydrate of lime to classification to remove gritty material therefrom and which classification is subsequent to the zone where the hydrating of the lime is completed but is prior to the introducing of the hydrate of lime into the diverted stream.

9. The treatment of water having calcium and magnesium hardness characteristics by the method which comprises dividing the water to be treated into a main flow and a diverted flow, supplying lime requisite for the water treating process by mixing the lime as a hydrate with the diverted flow, subjecting to primary or initial sedimentation the diverted flow thus treated whereby there is effected a settling of substantially the entire magnesium content and of some of the calcium content of the diverted portion, passing the sludge resulting from the initial sedimentation along one path by which at least some of such sludge and thereby a substantial part of the magnesium content is eliminated from the water being treated, passing the effluent from the primary sedimentation along another path leading to the main flow and mixing the two flows and thereafter subjecting the thus mixed flows to a main or second sedimentation, subjecting the effluent from the main sedimentation to carbonation and ultimately filtering the same preparatory to distributing the treated water for use, passing settled sludge from the main sedimentation to a filter for further removing water from the sludge, calcining the filtered sludge and thereby converting into quicklime the calcium component of the sludge, hydrating the calcined product thus produced and employing the resulting hydrating lime to supply the lime requisite for the process.

10. In the treatment of water according to the method defined in and by claim 9 the hydrating of the lime and the subsequently passing of the lime after it has been hydrated through a classifier for removing grit from the hydrated lime prior to the mixing of the hydrated lime with the diverted flow.

11. In a water softening or sewage treatment system in combination means by which the influent to be filtered is divided so as to provide a diverted portion and an undiverted portion, a first mixing means by which lime in excess of the requirements for the treatment of the diverted portion is mixed with the diverted portion for the purpose of liming or dosing the latter, a sedimentation means by which the dosed or limed diverted portion is subjected to preliminary or initial sedimentation, means by which the effluent from said preliminary sedimentation moves along one path, means by which the resulting sludge of said preliminary sedimentation moves or passes along a second path whereby all or a part of settled sludge can be caused to pass from the system, a second or main mixing means into which the undiverted portion flows and into which the dosed effluent from said preliminary or initial sedimentation flows whereby there is effected a mixing of the dosed effluent with the undiverted portion and a consequent dosing or liming of the undiverted portion as the result of said mixing, a second sedimentation means by which the mixed flow is subjected to a main or second sedimentation, means for conducting the effluent of the second sedimentation along one path so that it ultimately passes to and into the distribution pipes, a kiln, means by which solids of the settled sludge derived from said second or main sedimentation are passed to said kiln, means by which calcined solids are conducted from the kiln to provide lime employed in the process.

HENRY G. LYKKEN.
JOSEPH B. ESTABROOK.